INVENTOR.
HAROLD G. SACHLEBEN

Nov. 1, 1966    H. G. SACHLEBEN    3,283,335
INSTRUMENT
Filed May 27, 1964    2 Sheets-Sheet 2
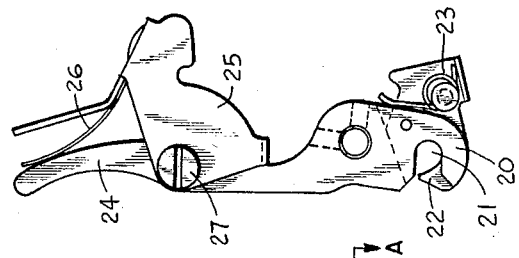
FIG. 4
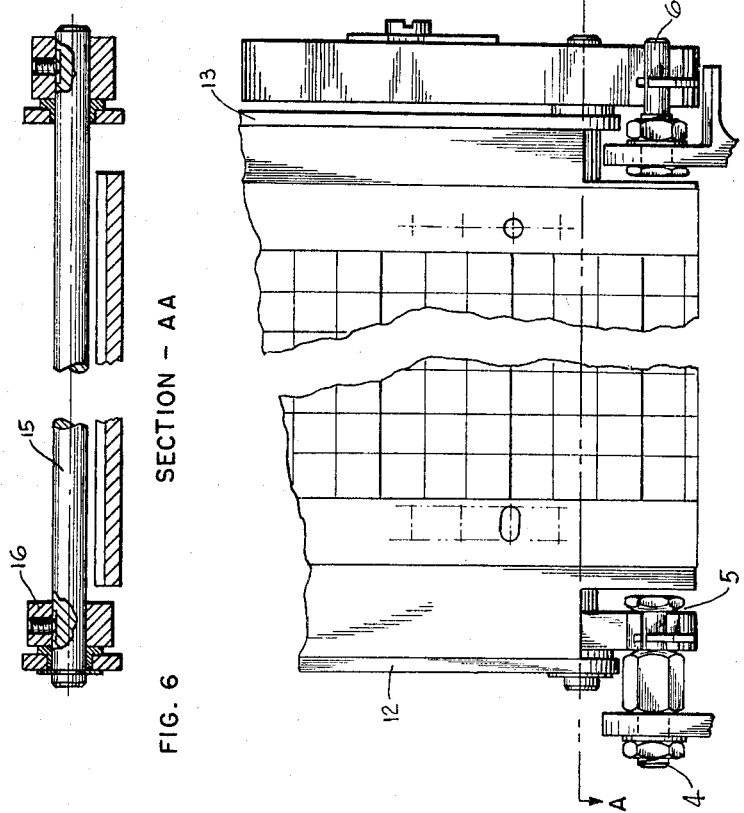
FIG. 6  SECTION - AA  FIG. 3
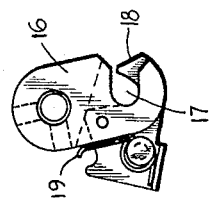
FIG. 5
INVENTOR.
HAROLD G. SACHLEBEN
BY Arthur H. Swanson 3,283,335
INSTRUMENT
Harold G. Sachleben, Bellmanor, N.J., assignor to Honeywell Inc., Minnesota, Minn., a corporation of Delaware
Filed May 27, 1964, Ser. No. 370,408
1 Claim. (Cl. 346—145)

This invention relates to a recorder comprising a stationary part or chassis and a removable part or chart carriage.

It is an object of this invention to provide means whereby the chart and/or the chart carriage may be removed from or supplied to the chassis extremely rapidly.

More specifically, it is an object of this invention to provide a chassis, a chart carriage pivotally mounted on the chassis, supporting pins mounted on the chassis, connecting links mounted on the chart carriage and supporting the chart carriage on the chassis, catches holding the connecting links onto the supporting pins, a lever mounted on the chart carriage and adapted to rock the connecting links about the supporting pins so as to help attach or detach the chart carriage to the chassis, a latch for holding said lever in one position of its path of travel, and a restricting link for attaching the chart carriage to the chassis.

Figure 1:
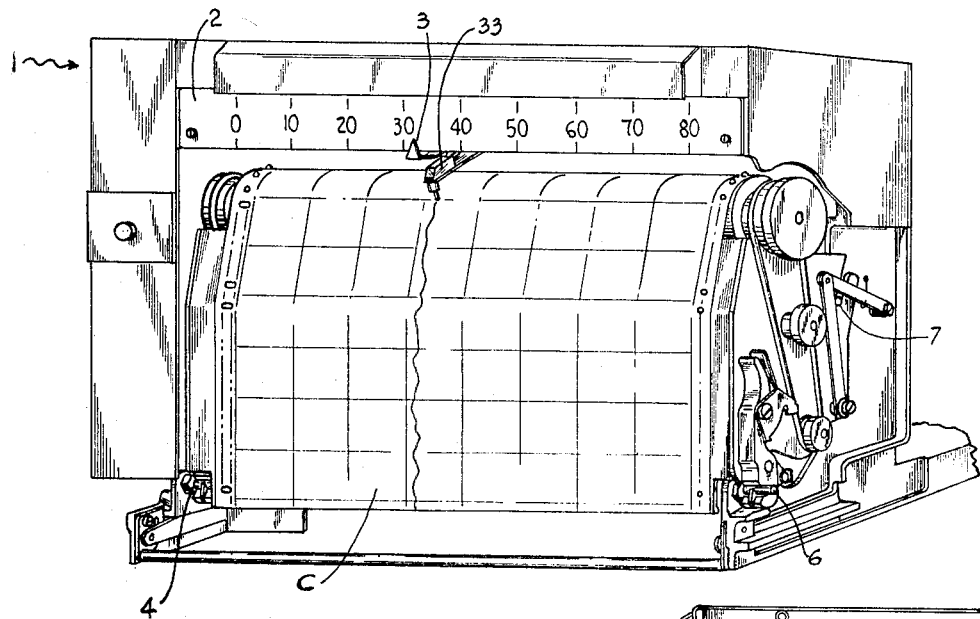
Figure 2:
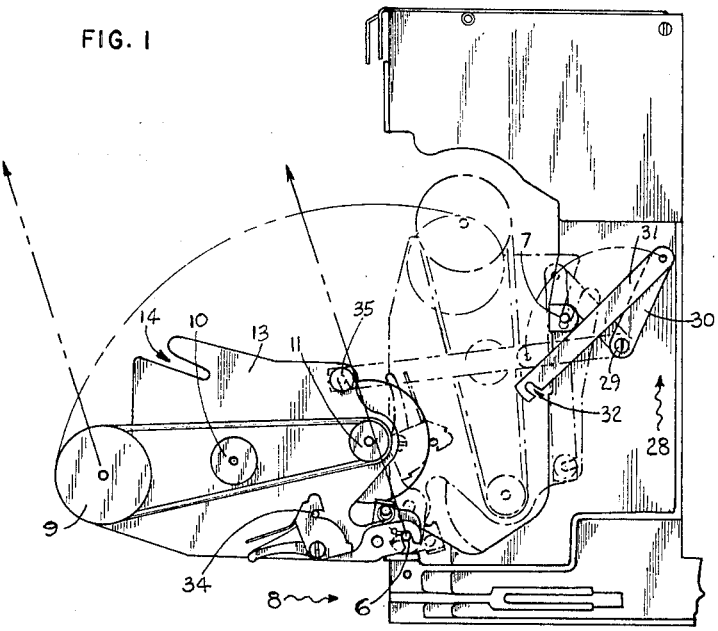

For a further exposition of this invention, reference may be had to the attached specification and drawings, in which:

FIG. 1 is perspective view from the right hand front.
FIG. 2 is an elevation of the right hand end of FIG. 1.
FIG. 3 is a partial, front elevation with parts broken away so as to permit the drawing to be made on a large scale.
FIG. 4 is an elevation of a portion of the right hand side of FIG. 3 showing the lever.
FIG. 5 is an elevation of a portion of the left hand side of FIG. 3 showing the left hand connecting link.
FIG. 6 is a cross section on line A—A of FIG. 3 as viewed in the direction of the arrows.

This recorder comprises a stationary part or chassis, generally indicated 1, having a scale 2 attached thereto. An indicator 3 is movable across scale 2 to indicate the instantaneous value of the variable being measured by the recorder. The recorder is also provided with a pen 33 adapted to make a record on a strip chart C.

Referring to FIGS. 1, 2 and particularly FIG. 3 of the drawings, it will be seen that a left hand pin 4 is mounted on the chassis 1. Pin 4 has a portion 5 of reduced cross section for a purpose to be hereinafter described. Chassis 1 also has a right hand pin 6 mounted on it.

A guide pin 7 is mounted on the chassis 1 and cooperates with a guide notch or cam 14 on the chart carriage so as to guide the chart carriage during its vertical movement toward or away from the pen 33.

The chart carriage, generally indicated 8, is mounted in the chassis 1 and is adapted to carry the chart C thereon. A drive rod 9 is connected to one end of a drive roll over which the chart C passes. A supply knob 10 is connected to one end of a supply roll over which the chart C likewise passes. A re-roll knob 11 is likewise connected to one end of a re-roll over which the chart C likewise passes.

Chart carriage 8 has a left hand side plate 12 and a right hand side plate 13 through which passes a rod 15 (FIG. 6). A left hand connecting link 16 is connected to the left end of rod 15 and has a radial slot 17 in it. A left hand catch 18 is pivotally mounted on left link 16 and is biased by spring 19 so as to close the slot 17 in the left hand connecting link 16.

A right hand connecting link 20 is connected to the right hand end of the rod 15 and has a slot 21 in it. Catch 22 is pivotally mounted on right link 20 and is biased by spring 23 to close slot 21 in the right hand connecting link 20.

FIG. 4 shows that right hand connecting link 20 has a manually operable lever 24 connected to it. A lever latch 25 is mounted on lever 24 by a supporting pin 27 and is biased by spring 26 for movement in a clockwise direction around supporting pin 27 as a pivot. Latch 25 has a notch in it adapted to cooperate with a latch pin 34 mounted on chart carriage 8.

Chassis 1 has a restricting link, generally indicated 28, mounted on a supporting pin 29 and comprising a first section pivoted at one portion to pin 29 and pivotally connected at another portion to a second section 31 having a slot 32 in it adapted to cooperate with a latch pin 35 on the chart carriage 8.

When it is desired to remove the chart carriage 8 from the chassis 1, the latch 25 is moved counter-clockwise so as to free it from the latch pin 34 mounted on the carriage. Lever 24 is then rotated counter-clockwise, as seen in FIG. 4, so as to lower the chart carriage away from the pen 33 by engagement of the guide notch 14 with the guide pin 7. The chart carriage is then rotated counter-clockwise, as seen in FIG. 2, to permit easy access to the chart C. The used chart C is removed. A new roll of chart is slipped between the supply spindle attached to supply knob 10. The end of the chart C is brought out and over the chart drive drum attached to the drive knob 9. The chart C is pushed underneath and taped to the re-roll drum attached to the re-roll knob 11.

The chart carriage is then swung back into position by being moved counter-clockwise by means of lever 24 so that the chart engages with the pen 33. The recorder is then ready for continued operation. Such a chart change can be accomplished in approximately thirty seconds. If a second chart carriage, already loaded with chart C is available, the first chart carriage can be removed from the chassis and the second chart carriage placed in the chassis in approximately ten seconds.

What is claimed is:

A recorder comprising a pen, a chassis, a first pair of spaced apart pivot shafts protruding from opposite sides of the chassis, a module comprising a chart and a chart carriage having a pair of spaced substantially parallel side plates, a wall forming an open sloping slot in opposing end portions of the side plates and each being constructed to slidably engage a different one of the first pair of pivots, an other end of one of the side plates being mounted for pivotal movement on a third pivot shaft, a lever pivotally mounted at one end on the third pivot shaft for rotatable arcuate movement about a fourth pivot shaft that is mounted on the chassis, the lever being mounted at its other end on a fifth pivot shaft for pivotable movement with one of the side plates about a fourth pivot shaft, a pin protruding from the side of the lever, a manually operated spring biased latch member pivoted on the lever for engagement with the pin when the module is in a recording position, the other side plate of the carriage being pivoted at its other end portion on one end of the third pivot shaft, a sixth pivot shaft mounted on the chassis and spaced from the third pivot shaft, a link pivotally connecting the other end of the third pivot shaft to the sixth pivot shaft, said pivot shafts being operable to initially directly move the chart and remaining portion of the module out of a recording position with the pen and into a non-recording position that is in parallel relation with its recording position when the spring bias latch member is manually moved to an unlatched position with its associated pin when the lever is moved to rotate the slotted wall portions of the side plates and the remaining portion of the module out of engagement with the first pair of pivots, and said pivot shafts being further operable to thereafter enable the side plates, chart and the remaining parts of the module to be rotated to a third position that is normal to said last mentioned non-recording position, and a manually depressable latch connected to the lever and link to rapidly remove the entire module from the fourth and sixth shafts and from the chassis when the module is in its third position.

References Cited by the Examiner

UNITED STATES PATENTS

| | | | |
|---|---|---|---|
| 1,847,918 | 3/1932 | Blanchard | 346—68 |
| 2,074,118 | 3/1937 | Ross et al. | 346—145 |
| 2,924,499 | 2/1960 | Young et al. | 346—145 |

RICHARD B. WILKINSON, *Primary Examiner.*

LEO SMILOW, *Examiner.*

J. W. HARTARY, *Assistant Examiner.*